US012703811B2

(12) United States Patent
Schurman

(10) Patent No.: US 12,703,811 B2
(45) **Date of Patent: *Aug. 11, 2026**

(54) METHOD AND SYSTEM TO PROVIDE A REPOSITIONABLE TRANSLUCENT CAST VINYL FILM WITH AN AIR-EGRESS ADHESIVE LAYER

(71) Applicant: LUXE LIGHTWRAP LLC, Shreveport, LA (US)

(72) Inventor: John Schurman, Shreveport, LA (US)

(73) Assignee: LUXE LIGHTWRAP LLC, Shreveport, LA (US)

( * ) Notice: Subject to any disclaimer, the term of this patent is extended or adjusted under 35 U.S.C. 154(b) by 356 days.

This patent is subject to a terminal disclaimer.

(21) Appl. No.: 17/518,735

(22) Filed: Nov. 4, 2021

(65) Prior Publication Data

US 2022/0127504 A1 Apr. 28, 2022

Related U.S. Application Data

(63) Continuation of application No. 16/152,438, filed on Oct. 5, 2018, now Pat. No. 11,180,682.

(51) Int. Cl.
*C09J 7/38* (2018.01)
*B60R 13/00* (2006.01)
(Continued)

(52) U.S. Cl.
CPC ............... *C09J 7/385* (2018.01); *B60R 13/00* (2013.01); *C09J 7/245* (2018.01); *C09J 133/02* (2013.01);
(Continued)

(58) Field of Classification Search
CPC . C09J 7/385; C09J 7/245; C09J 133/02; C09J 2203/354; C09J 2203/37;
(Continued)

(56) References Cited

U.S. PATENT DOCUMENTS 2,434,231 A 1/1948 Seitz
2,704,735 A 3/1955 Hedges et al.
(Continued)

FOREIGN PATENT DOCUMENTS

EP 2604444 B1 * 10/2015 ................ C09J 7/24
WO WO-2008002793 A1 * 1/2008 ............. G09F 19/22
(Continued)

OTHER PUBLICATIONS

"Universal Tint Kits", by Luxe Auto Concepts, Found Online [Mar. 15, 2019] https://www.luxeconcepts.net/collections/universal-tint-kits.

(Continued)

*Primary Examiner* — Scott R. Walshon
(74) *Attorney, Agent, or Firm* — Garvey, Smith & Nehrbass, Patent Attorneys, L.L.C.; Julia M. FitzPatrick; Vanessa M. D'Souza

(57) ABSTRACT

Disclosed are a method, a device and/or a system of cast vinyl film and, more particularly, to a method and system to provide a repositionable translucent cast vinyl film with an air egress adhesive layer. In one aspect, a method includes mixing a solvent based polyvinyl chloride (PVC) organosol with a stabilizer and an additive to get a desired shade of pellucid tint of a translucent thermoplastic stretch wrap film. Further, the method includes casting the polyvinyl chloride (PVC) organosol onto a film carrier and moving the film carrier through a plurality of ovens at varying temperatures to care into a solid film. The cured solid film is laminated to an air-egress liner casted with a solvent-borne acrylic pressure-sensitive adhesive to provide ease of installation. The adhesive includes an air release patterning to allow escape of air from back of the film while repositioning the film around a complex shaped surface.

23 Claims, 7 Drawing Sheets

(51) Int. Cl.
*C09J 7/24* (2018.01)
*C09J 133/02* (2006.01)
*F21S 41/37* (2018.01)
*F21S 45/10* (2018.01)
*F21W 102/00* (2018.01)
*G02B 1/10* (2015.01)

(52) U.S. Cl.
CPC ................ *F21S 41/37* (2018.01); *G02B 1/10* (2013.01); *C09J 2203/354* (2020.08); *C09J 2203/37* (2020.08); *C09J 2301/122* (2020.08); *C09J 2427/006* (2013.01); *C09J 2433/00* (2013.01); *F21S 45/10* (2018.01); *F21W 2102/00* (2018.01)

(58) Field of Classification Search
CPC ............ C09J 2301/122; C09J 2427/006; C09J 2433/00; C09J 7/401; C09J 7/405; C09J 2467/005; C09J 2423/005; C09J 7/40; C09J 2201/128; C08L 2201/56; G02B 1/10; B60R 13/00; F21S 41/37; F21W 2102/00
See application file for complete search history.

(56) References Cited

U.S. PATENT DOCUMENTS

| | | | |
|---|---|---|---|
| 3,171,873 | A | 3/1965 | Fikentscher et al. |
| 3,623,944 | A | 11/1971 | Davis |
| 4,391,868 | A | 7/1983 | McCarthy, Jr. |
| 5,800,919 | A | 9/1998 | Peacock et al. |
| 6,013,722 | A | 1/2000 | Yang et al. |
| 6,586,510 | B1 | 7/2003 | Brown et al. |
| 6,857,737 | B2 | 2/2005 | Emslander et al. |
| 11,180,682 | B2 | 11/2021 | Schurman |
| 2003/0127179 | A1 | 7/2003 | Pasti |
| 2007/0213463 | A1 | 9/2007 | Sherman et al. |
| 2013/0288052 | A1 | 10/2013 | Tapio et al. |
| 2014/0332151 | A1* | 11/2014 | Loescher .............. B32B 27/304 156/247 |
| 2017/0129230 | A1 | 5/2017 | Wang et al. |
| 2017/0198168 | A1 | 7/2017 | Baetzold et al. |
| 2018/0126695 | A1 | 5/2018 | Niedersuss et al. |
| 2019/0376658 | A1 | 12/2019 | Zrihan |
| 2020/0109315 | A1 | 4/2020 | Schurman |

FOREIGN PATENT DOCUMENTS

| | | |
|---|---|---|
| WO | WO2008026751 | 3/2008 |
| WO | WO2013090654 | 6/2013 |
| WO | WO2014133834 | 9/2014 |
| WO | WO2015200742 | 12/2015 |
| WO | WO2016162357 | 10/2016 |

OTHER PUBLICATIONS

Luxe LightWrap Product Data Sheet, Smoke Series (created Jun. 29, 2018, posted on-line at least as early as Jul. 16, 2018).

Video published at http://www.workplaydrive.com/youtube/new-luxe-auto-concepts-lightwrap-california-balckout-tour/ (published to YouTube on Mar. 13, 2018).

Web page print out where the video published at the following web page is available (http://www.workplaydrive.com/youtube/new-luxe-auto-concepts-lightwrap-california-blackout-tour/) (published to YouTube Mar. 13, 2018).

* cited by examiner

INSTALLATION VIEW
350A

METHOD AND SYSTEM TO PROVIDE A REPOSITIONABLE TRANSLUCENT CAST VINYL FILM WITH AN AIR-EGRESS ADHESIVE LAYER

FIELD OF TECHNOLOGY

This disclosure relates generally to a cast vinyl film and, more particularly, to a method and system to provide a repositionable, tinted translucent cast vinyl film with an air-egress adhesive layer to visually change the appearance of an automotive light and chrome, and having shape conforming properties.

BACKGROUND

A vinyl wrap may be used to change the appearance and/or form a protective layer around an exposed surface of automobile lighting, on architectural lighting, for illuminated lighting in hospitals, decorative decals on automobiles, on skylights, promotional items, and/or signboards. The vinyl wraps used for tinting may require application fluid to be applied on a surface prior to installation and may be limited to non-complex surface installation. The increasingly complex shapes of lighting and products may make installation of the vinyl wrap a time consuming and wasteful task. Bubbles may form in air pockets, the vinyl wrap may tear, and the vinyl wrap may stick together creating unwanted waste and significant productivity loss when installing the vinyl wrap on complex contours of modern automobile lighting for example.

In addition, the vinyl wrap may form air-bubbles while applying the wrap onto the exposed surface. The vinyl wrap may have permanent adhesive that may not allow the wrap to be lifted up and reapplied for proper installation. Further, the vinyl wrap may not be stretchable enough to accurately reposition the film, and may get damaged on stretching while installation with limited lifespan, making it expensive to use. Furthermore, the vinyl wrap may leave glue marks behind on removing the vinyl wrap from the applied surface, giving an unpleasant appearance to the applied surface.

SUMMARY

Disclosed are a method, a device and/or a system of a cast vinyl film and, more particularly, to a method and system to provide a repositionable, tinted translucent cast vinyl film with an air-egress adhesive layer to visually change the appearance of an automotive light and chrome, and having shape conforming properties.

In one aspect, a method includes forming a translucent cast vinyl film with air-egress adhesive layer to change visual appearance of an automotive light. The method includes mixing a solvent based polyvinyl chloride (PVC) organosol with a stabilizer and an additive to get a desired shade of pellucid tint of the translucent cast vinyl film. In addition, the method includes casting the solvent based polyvinyl chloride (PVC) organosol onto a film carrier using a reverse roll coating process to attain a three-dimensional stretchability and/or durability of the translucent cast vinyl film. The casting of the solvent based PVC organosol onto the film carrier causes an increased stretchability and/or durability of the translucent cast vinyl film when installed on a complex shaped surface with no-to-minimal shrinking back of the translucent cast vinyl film.

The method further includes moving the film carrier through a plurality of ovens at varying temperatures to be cured into a solid film to wound on itself for continued processing. Furthermore, the method includes laminating the cured solid film to an air-egress liner casted with a solvent-borne acrylic pressure-sensitive adhesive to provide an ease of installation.

The solvent-borne acrylic pressure-sensitive adhesive includes an air release patterning to allow escape of air from the back of the translucent cast vinyl film at the time of installation of the translucent cast vinyl film onto the automotive light. The solvent-borne acrylic pressure-sensitive adhesive eliminates the use of an application fluid at the time of installation. The solvent-borne acrylic pressure-sensitive adhesive is a clear semi-permanent adhesive that allows a faster dry installation of the translucent cast vinyl film. The air release patterning includes air-egress channels to allow liquification of the adhesive by heating for an easy installation. The solvent-borne acrylic pressure-sensitive adhesive allows repositioning of the translucent cast vinyl film around a complex, bulbous shaped surface without the use of application fluid. The solvent-borne acrylic pressure-sensitive adhesive layer remains unaffected by lifting-up and re-application of the translucent cast vinyl film while repositioning the translucent cast vinyl film.

The method may include composing the translucent cast vinyl film using a polyvinyl chloride (PVC) resin adjoined with a clear semi-permanent adhesive to allow a faster, bubble free installation for long term removability without the use of any applicator fluid. In addition, the clear semi-permanent adhesive allows the translucent cast vinyl film to be removed cleanly without leaving any residue on the applied surface.

The film carrier may be a paper or polyester to create a final finish of a gloss, a satin and/or a matte. The method may include the air release patterning of the solvent-borne acrylic pressure-sensitive adhesive riddled in the form of finely carpeted diamonds with adjoining air release channels to enable escape of air through the air release channels.

In addition, the air release patterning may be independent of the shape of the solvent-borne acrylic pressure-sensitive adhesive to enable escape of air through the air release channels. The air release patterning of the solvent-borne acrylic pressure-sensitive adhesive may allow a lifting up and/or repositioning of the translucent cast vinyl film a number of times for appropriate positioning of the film without any tearing down of the cast vinyl film and/or damage to the adhesive layer.

The air release patterning of the solvent-borne acrylic pressure-sensitive adhesive may disappear from the back of the cast vinyl film once it is installed onto an exposed surface of an article.

The method may include forming the cast vinyl film from a liquid organosol comprising a dispersed polyvinyl chloride resin mixed with a plasticizer and a diluent, such as a colloidal solution in an organic liquid. Additionally, the method nay include forming the cast vinyl film from a thermosetting polymer, such as polyurethane, unsaturated polyesters, phenolics and/or epoxies.

The method may further include forming the solvent based polyvinyl chloride (FVC) organosol using a 100 parts of vinyl resin, up to 100 parts of plasticizer, up to 100 parts of pigment formulations and/or a combination of active solvents, such as dispersants and/or diluents. The pigment formulation may help screen out the UV radiation and/or minimize UV degradation of the translucent cast vinyl film.

In another aspect, a tinted translucent cast vinyl film with a clear air-egress adhesive layer having shape conforming properties includes a solvent based polyvinyl chloride (PVC) organosol mixed with a stabilizer and/or an additive to get a preferred shade of semi-transparent color of the translucent cast vinyl film to be installed onto an exterior light and/or chrome to change a visual appearance of an automotive light and a chrome. The solvent based polyvinyl chloride (PVC) organosol is formed using a 100 parts of vinyl resin, up to 100 parts of plasticizer, up to 100 parts of pigment formulations and/or a combination of active solvents and/or diluents.

The tinted translucent cast vinyl film includes a film carrier to form a base to cast the solvent based polyvinyl chloride (PVC) organosol onto the film carrier using a reverse roll coating process to attain a three-dimensional stretchability of up to 130% of the tinted translucent cast vinyl film.

The solvent based. PVC organosol casted onto the film carrier causes an increased stretchability and/or durability of the tinted translucent cast vinyl film when installed on a complex shaped surface with no to minimal shrinking back of the tinted translucent cast vinyl film.

The tinted translucent cast vinyl film further includes a solid film formed by curing the film carrier by moving film carrier through a plurality of ovens at varying temperatures to be wound on itself for continued processing. The cured solid film is laminated to an air-egress liner casted with a solvent-borne acrylic pressure-sensitive adhesive to provide an ease of installation.

The solvent-borne acrylic pressure-sensitive adhesive, includes an air release patterning having air-egress channels to allow escape of air from the back of the timed translucent cast vinyl film at the time of installation of the tinted translucent cast vinyl film onto the automotive light and/or the chrome. The solvent-borne acrylic pressure-sensitive adhesive eliminates the use of an application fluid for installation of the tinted translucent cast vinyl film. The solvent-borne acrylic pressure-sensitive adhesive allows faster dry installation of the tinted translucent cast vinyl film onto a complex, bulbous shape of the automotive light and chrome. The solvent-borne acrylic pressure-sensitive adhesive is semi-permanent to allows repositioning of the tinted translucent cast vinyl film around a complex, bulbous shaped surface. The solvent-borne acrylic pressure-sensitive adhesive is liquified with application of heat to allow appropriate positioning of the tinted translucent cast vinyl film. The solvent-borne acrylic pressure-sensitive adhesive is semi-permanent to allow clean removability leaving less than 30% of adhesive residue.

The tinted translucent cast vinyl film may be designed to remain removable using heat and/or chemicals for a prolonged period of up to 3 years. The tinted translucent cast vinyl film may be composed using a polyvinyl chloride (PVC) resin adjoined with a clear semi-permanent adhesive to allow a faster, bubble-free installation for long term removability.

In yet another aspect, a tinted translucent vinyl film with a clear air-egress adhesive layer includes a top layer of a cast PVC vinyl formed by casting a liquid organosol mixture blended with a plasticizer and a diluent and a base layer of an acrylic pressure-sensitive adhesive with air-egress channels on a removable paper liner. The liquid organosol mixture includes a dispersed polyvinyl chloride resin. The base layer is formed using a viscoelastic material adhered to the top layer of the cast PVC vinyl upon application of light contact pressure to allow repositioning of the tinted translucent cast vinyl film around the complex bulbous shaped surface of an automotive light and a chrome.

The clear air-egress adhesive layer may be a solvent-borne acrylic pressure-sensitive viscous material which includes an air release patterning with air-egress channels to allow escape of air from the back of the tinted translucent cast vinyl film at the time of installation.

The method of preparation and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
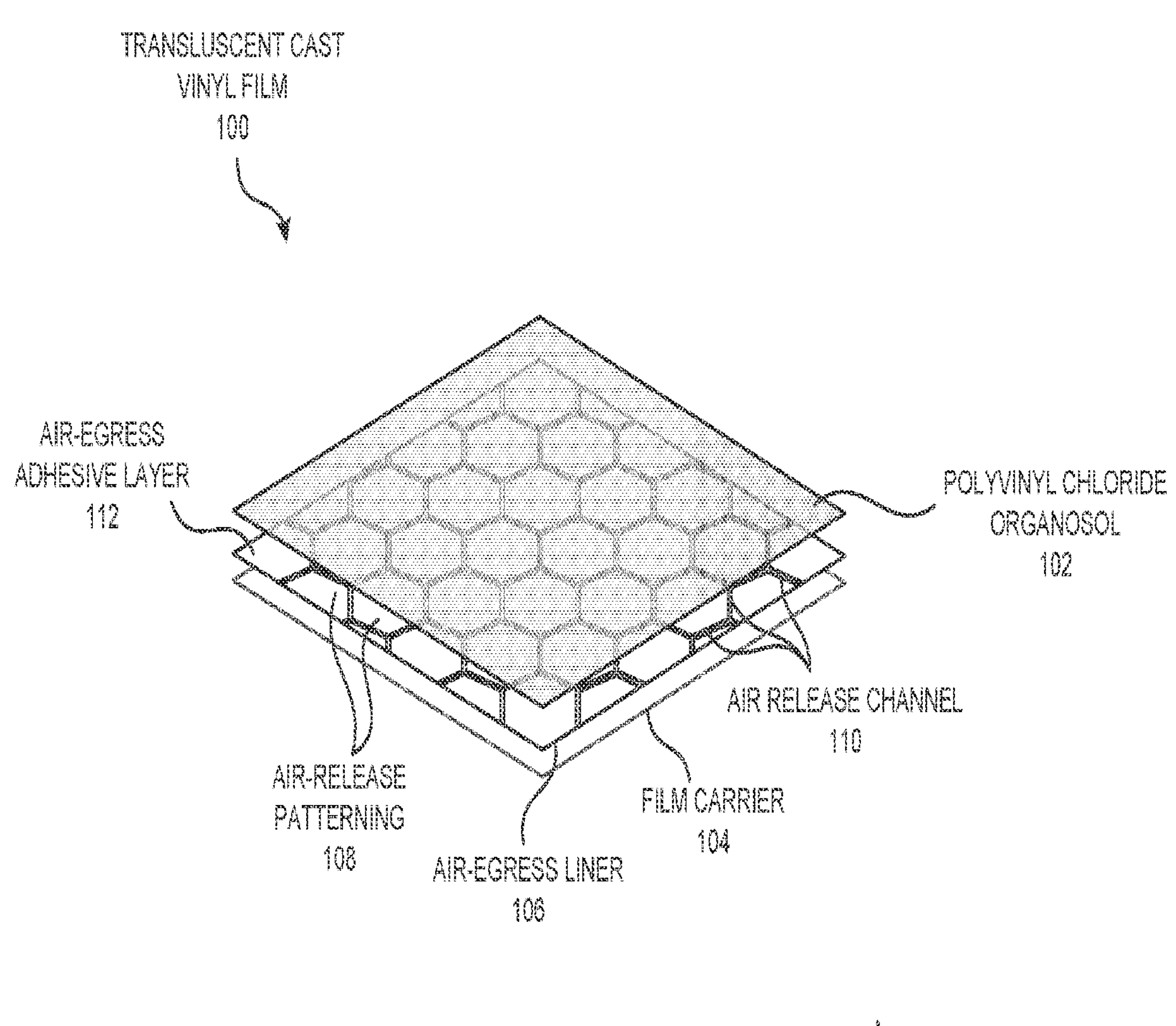
FIG. 1 is a structural view of the translucent cast vinyl film illustrating the constituent layers of the translucent cast vinyl film, according to one embodiment.

Other features of the present embodiments will be apparent from the accompanying drawings and from the detailed description that follows, according to one embodiment.

DETAILED DESCRIPTION

Example embodiments, as described below, may be used to provide a tinted cast vinyl film and, more particularly, method and system to provide a repositionable translucent cast vinyl film with an air-egress adhesive layer (e.g., translucent cast vinyl film 100) with shape conforming properties.

In one embodiment, a method includes forming a translucent cast vinyl film 100 with air-egress adhesive layer 112 to change visual appearance of an automotive light 302. The method includes mixing a solvent based polyvinyl chloride (PVC) organosol 202 with a stabilizer and an additive to get a desired shade of pellucid tint of a translucent cast vinyl film 100. In addition, the method includes casting the polyvinyl chloride (PVC) organosol 102 onto a film carrier 104 using a reverse roll coating process to attain a three-dimensional stretchability and/or durability of the translucent cast vinyl film 100. The casting of the solvent based PVC organosol 202 onto the film carrier 104 causes an increased stretchability and/or durability of the translucent cast vinyl film 100 when installed on a complex shaped surface with no to minimal shrinking back of the translucent cast vinyl film 100.

The method further includes moving the film carrier 104 through a plurality of ovens 210 at varying temperatures to be cured into a solid film to wound on itself for continued processing. Furthermore, the method includes laminating the cured solid film 212 to an air-egress liner 106 casted with a solvent-borne acrylic pressure-sensitive adhesive (e.g., air-egress adhesive) to provide an ease of installation.

The solvent-borne acrylic pressure-sensitive adhesive (e.g., air-egress adhesive) includes an air release patterning 108 to allow escape of air from the back of the translucent cast vinyl film 100 at the time of installation of the translucent cast vinyl film 100 onto the automotive light 302. The solvent-borne acrylic pressure-sensitive adhesive (e.g., air-egress adhesive) eliminates the use of an application fluid at the time of installation. The solvent-borne acrylic pressure-sensitive adhesive (e.g., air-egress adhesive) is a clear semi-permanent adhesive to allow a faster dry installation of the translucent east vinyl film 100. The air release patterning 108 includes air-egress channels 110 to allow liquification of the adhesive by heating (e.g., using heat application 312) for an easy installation. The solvent-borne acrylic pressure-sensitive adhesive includes a semi-permanent adhesive e.g., air-egress adhesive) to allow repositioning of the translucent cast vinyl film 100 around a complex shaped surface (e.g., automotive light 302, skylight 402). The solvent-borne acrylic pressure-sensitive adhesive layer (e.g., air-egress adhesive layer 112) remains unaffected by lifting up and repositioning of the translucent cast vinyl film 100 while applying the translucent cast vinyl film 100.

The method may include composing the translucent cast vinyl film 100 using a polyvinyl chloride (PVC) resin adjoined with a clear semi-permanent adhesive (e.g., air-egress adhesive) to allow a faster, bubble free installation for a long term removability (e.g., up to 3 years).

The film carrier 104 may be a paper or polyester to create a final finish of a gloss, a satin and/or a matte. The method may include the air release patterning 108 of the solvent-borne acrylic pressure-sensitive adhesive (e.g., air-egress adhesive) riddled in the form of finely carpeted diamonds (e.g., air-release patterning 108) with adjoining air release channels 110 to enable escape of air through the air release channels 110.

In addition, the air release patterning 108 may be independent of the shape of the solvent-borne acrylic pressure-sensitive adhesive (e.g., air-egress adhesive) to enable escape of air through the air release channels 110. The air release patterning 108 of the solvent-borne acrylic pressure-sensitive adhesive (e.g., air-egress adhesive) may allow a lifting-up and/or reapplication 310 of the translucent cast vinyl film 100 a number of times for appropriate positioning of the film without any tearing down of the translucent cast vinyl film 100.

The method may include the air release patterning 108 of the solvent-borne acrylic pressure-sensitive adhesive (e.g., air-egress adhesive) to disappear from the back of the cast vinyl film once it is installed onto an exposed surface of an article (e.g., automotive light 302, skylight 402).

The method may include forming the translucent cast vinyl film 100 from a liquid organosol which includes a dispersed polyvinyl chloride resin mixed with a plasticizer and a diluent, such as a colloidal solution in an organic liquid. Additionally, the method may include forming the translucent cast vinyl film 100 from a thermosetting polymer, such as polyurethane, unsaturated polyesters, phenolics and/or epoxies.

The method may include forming the solvent based polyvinyl chloride (PVC) organosol 202 using a 100 parts of vinyl resin, up to 100 parts of plasticizer, up to 100 parts of pigment formulations and/or a combination of active solvents, such as dispersants and/or diluents. The pigment formulation of the solvent based polyvinyl chloride (PVC) organosol 202 may help screen out the UV radiation and/or minimize UV degradation of the translucent cast vinyl film 100.

In another embodiment, a tinted translucent cast vinyl film (e.g., translucent cast vinyl film 100) with a clear air-egress adhesive layer 112 having shape conforming properties includes a solvent based polyvinyl chloride (PVC) organosol 202 mixed with a stabilizer and an additive to get a preferred shade of semi-transparent tinted translucent cast vinyl film (e.g., translucent cast vinyl film 100) to be installed onto an exterior light (e.g., automotive light 302) and/or chrome to change a visual appearance of an automotive light 302 and a chrome. The solvent based polyvinyl chloride (PVC) organosol 202 is formed using a 100 parts of vinyl resin, up to 100 parts of plasticizer, up to 100 parts of pigment formulations and/or a combination of active solvents and/or diluents.

The tinted translucent cast vinyl film (e.g., translucent cast vinyl film 100) includes a film carrier 104 to form a base to cast the solvent based polyvinyl chloride (PVC) organosol 202 onto the film carrier 104 using a reverse roll coating process to attain a three-dimensional stretchability of up to 130% of the tinted translucent cast vinyl film (e.g., translucent cast vinyl film 100).

The solvent based PVC organosol 102 casted onto the film carrier 104 causes an increased stretchability and/or durability of the tinted translucent cast vinyl film (e.g., translucent cast vinyl film 100) installed on a complex shaped surface (e.g., automotive light 302) with no to minimal shrinking back of the tinted translucent cast vinyl film (e.g., translucent cast vinyl film 100).

The tinted translucent cast vinyl film (e.g., translucent cast vinyl film 100) further includes a solid film formed by curing the film carrier 104 by moving the film carrier 104 through a plurality of ovens 210 at varying temperatures to be wound on itself for continued processing. The cured solid film 212 laminated to an air-egress liner 106 casted with a solvent-borne acrylic pressure-sensitive adhesive (e.g., air-egress adhesive) provides an ease of installation.

The solvent-borne acrylic pressure-sensitive adhesive (e.g., air-egress adhesive) includes an air release patterning 108 having air-egress channels to allow escape of air from the back of the tinted translucent cast vinyl film (e.g., translucent cast vinyl film 100) at the time of installation of the tinted translucent cast vinyl film (e.g., translucent cast vinyl film 100) on the automotive light 302 and the chrome. The solvent-borne acrylic pressure-sensitive adhesive (e.g., air-egress adhesive) eliminates the use of an application fluid for installation of the tinted translucent cast vinyl (e.g., translucent cast vinyl film 100). The solvent-borne acrylic pressure-sensitive adhesive allows faster dry installation of the tinted translucent cast vinyl film 100 onto a complex, bulbous shape of the automotive light 302 and chrome. The solvent-borne acrylic pressure-sensitive adhesive (e.g., air-egress adhesive) is semi-permanent to allow repositioning of the tinted translucent cast vinyl film (e.g., translucent cast vinyl film 100) around a complex shaped surface automotive light 302). The solvent-borne acrylic pressure-sensitive adhesive liquifies with application of heat 312 to allow appropriate re-positioning of the tinted translucent cast vinyl film (translucent cast vinyl film 100). The solvent-borne acrylic pressure-sensitive adhesive (e.g., egress adhesive) is semi-permanent to allow clean removability leaving less than 30% of adhesive residue.

The tinted translucent cast vinyl film (e.g., translucent cast vinyl film 100) may be designed to remain removable using heat (e.g., heat application 312) and/or chemicals for a prolonged period of up to 3 years.

In yet another embodiment, a tinted translucent vinyl film (e.g., translucent cast vinyl film 100) with a clear air-egress adhesive layer 112 includes a top layer of a cast PVC vinyl formed by casting a liquid organosol (e.g., polyvinyl chloride organosol 102) mixture blended with a plasticizer and a diluent and a base layer of an acrylic pressure-sensitive adhesive (e.g., air-egress adhesive layer 112) with air-egress channels 110 on a removable paper liner. The liquid organosol mixture includes a dispersed polyvinyl chloride resin. The base layer is formed using a viscoelastic material (e.g., air-egress adhesive layer 112) adhered to the top layer of the cast PVC vinyl (e.g., polyvinyl chloride organosol 102) upon application of light contact pressure to allow repositioning of the tinted translucent cast vinyl film (e.g., translucent cast vinyl film 100) around the complex, bulbous shaped surface of an automotive light 302 and/or a chrome.

The clear air-egress adhesive layer 112 may be a solvent-borne acrylic pressure-sensitive viscous material which includes an air release patterning 108 with air-egress channels (e.g., air release channel 110) to allow escape of air from the back of the tinted translucent cast vinyl film.

FIG. 1 is a structural view 150 of the translucent cast vinyl film 100 illustrating the constituent layers of the translucent cast vinyl film 100, according to one embodiment. Particularly, FIG. 1 illustrates a translucent cast vinyl film 100, a polyvinyl chloride organosol 102 layer, a film carrier 104, an air-egress liner 106, an air-release patterning 108, air release channel 110, and an air-egress adhesive layer 112, according to one embodiment.

The translucent cast vinyl film 100 may be a semi-transparent and/or transparent stretchable plastic film that may be wrapped around an exposed surface of an automobile lighting, chronic and/or skylight to visually change its appearance. The translucent cast vinyl film 100 may be composed of a PVC resin adjoined with a pressure-sensitive adhesive (e.g., air-egress adhesive), according to one embodiment.

The translucent cast vinyl film 100 may be a thin flexible semi-transparent layer of plastic that allows tinting and/or cosmetic enhancement of the exposed surface of the vehicle automotive, lights, chronic, skylights, and/other clear plastics applications which require exterior exposure, and are having a complex shaped surface. The translucent cast vinyl film 100 may have a semi-permanent adhesive (e.g., air-egress adhesive) to allow lifting-up and repositioning of the film while applying the film onto the light exposed to the environmental conditions. The translucent cast vinyl film 100 may be made with a non-porous and low particle size 3 micron) micro-suspension/emulsion resin, according to one embodiment.

The translucent cast vinyl film 100 may be characterized by the light tint range of colors and translucency of the finished product. The translucent cast vinyl film 100 may include a solvent based PVC organosol 202 mixture including stabilizers and additives to increase exterior durability and/or stretchability that may be color matched to a desired shade, according to one embodiment.

The translucent cast vinyl film 100 may have a viscoelastic material (e.g., semi-permanent glue, air-egress adhesive) with an air-release patterning 108 on the back that allows it to put it on and take it off a multiple times without tearing it down to pieces. It may be stretched three-dimensionally to conform around any complex shape. The glue in the air-egress adhesive layer 112 at the back of the translucent cast vinyl film 100 may become invisible once it is applied to the exposed surface. Once the translucent cast vinyl film 100 is stretched to 10%, the air channels may go away and become invisible. The translucent cast vinyl film 100 may have less chance of developing air-pockets. The air-egress adhesive of air-egress adhesive layer 112 may be riddled perfect pattern of diamonds with adjoining air release channels 110. In another embodiment, the air release patterning 108 may be of any shape (e.g., rectangular, octagonal), according to one embodiment.

The polyvinylchloride organosol 102 may be an organic solvent containing suspension of particles of polyvinyl chloride resin in a plasticizer. The polyvinyl chloride organosol 102 may contain a mixture of solvents and non-solvents such as, glycols, and/or alcohols. The polyvinyl chloride organosol 102 may be a self-adhesive organosol and/or plastisol containing epoxy resin additives and/or similar adhesion promoters. The formulation of polyvinyl chloride organosol 102 for producing relatively flexible films may include the following composition (e.g., in parts by weight): emulsion PVC dispersion (e.g., 43), plasticiser (e.g., 34), epoxidised plasticiser (e.g., 2), organotin stabilisers (e.g., 1), pigments (e.g., 8), and fillers (e.g., 10), according to one embodiment.

The polyvinyl chloride organosol 102 may be casted onto a film carrier 104 to form the translucent cast vinyl film 100. The film carrier 104 may be a layer of paper or polyester on which the polyvinyl chloride organosol 102 may be casted using reverse roll coating process, according to one embodiment.

The air-egress liner 106 may be comprised of multiple layers of paper, a polyethylene coating and a siliconization layer. The polyethylene coating of the air-release may be embossed with a textured pattern. The textured structure of the air-release liner may impart tiny air channels in the adhesive of the vinyl film (e.g., translucent cast vinyl film 100). At the time of installation, these tiny air channels (e.g., air release channels 110) in the adhesive of the vinyl film (e.g., translucent cast vinyl film 100) may act as escape routes for air. As the installer squeegees the surface of the object while installing the translucent cast vinyl film 100 (e.g., automotive light 302), the air between the film and the substrate is directed through the air channels (e.g., air release channels 110) to the edge of the graphic and/or surface, eliminating bubbles 306 and wrinkles 308 from applied object (e.g., automotive light 302), according to one embodiment.

The air-release patterning 108 may be a repetitive structure of the adhesive layer (e.g., air-egress adhesive layer 112) with peripherally situated air release channels 110 at the back of the translucent cast vinyl film 100 that allow escape of air from the be back of the translucent cast vinyl film 100 at the time of installation on an exposed surface of the object (e.g., automotive light 302), The air-release patterning 108 may be a square and/or any other shape pattern. The property of air-release patterning 108 may be independent of shape of the pattern. It may be based on the size and/or distance between each shape. The air-release patterning 108 may have a web-like structure of interconnected tiny air channels which may enable air escape from behind the translucent cast vinyl film 100 at the time of installation of the film, according to one embodiment.

The air release channel 110 may be the tiny air passages in the air-egress adhesive layer 112 of the vinyl film that act as escape routes for air from the back of the translucent cast vinyl film 100, according to one embodiment.

The air-egress adhesive layer 112 may be a thin coating of an acrylic pressure-sensitive adhesive formed using viscoelastic material to adhere to the top layer of the cast PVC vinyl (e.g. polyvinyl chloride organosol 102, cured solid film 212) upon application of light contact pressure. The air-egress adhesive layer 112 may be a semi-permanent adhesive layer which may allow easy and faster installation of the translucent cast vinyl film 100 onto an automotive light 302. The viscoelastic material of the air-egress adhesive layer 112 may allow the translucent cast vinyl film 100 to be lifted up to remove the air pockets and wrinkles from behind the film, and reposition it while installing the translucent cast vinyl film 100 onto the exposed surface. The viscoelastic material of the air-egress adhesive layer 112 may eliminate the use of an applicator fluid while installing the translucent cast vinyl film 100 onto the exposed surface of the automotive light 302, according to one embodiment.

Figure 2A:
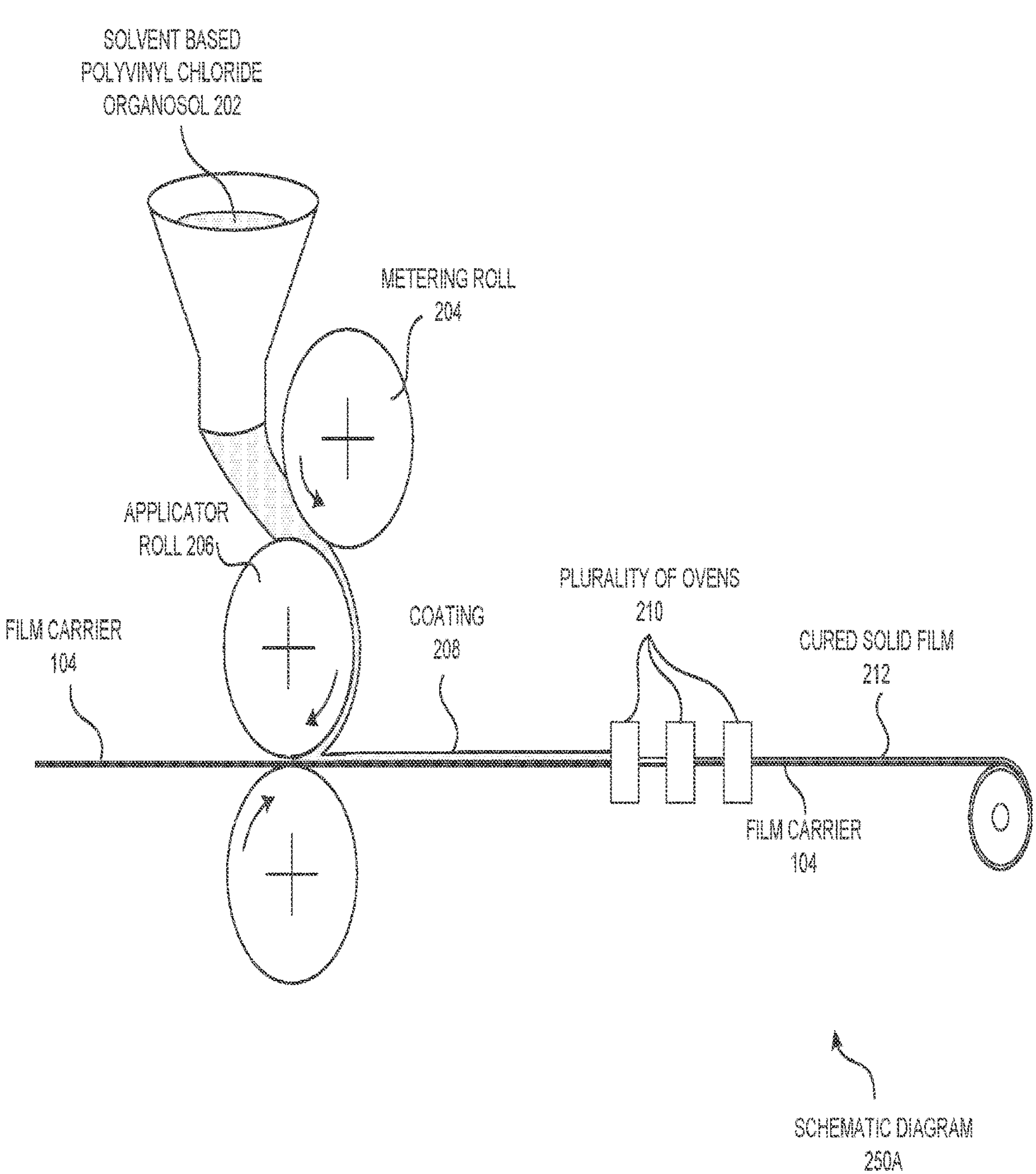
FIG. 2A is a schematic diagram illustrating the curing of solvent based polyvinyl chloride organosol of FIG. 1 over a film carrier substrate through a reverse roll process, according to one embodiment.

FIG. 2A is a schematic diagram 250A illustrating the curing of solvent based polyvinyl chloride organosol 202 over a film carrier 104 substrate through a reverse roll process, according to one embodiment. Particularly, FIG. 2A builds on FIG. 1 and further adds, a solvent-based polyvinyl chloride organosol 202, a metering roll 204, applicator roll 206, a coating 208, plurality of ovens 210, and a cured solid film 212, according to one embodiment.

The solvent-based polyvinyl chloride organosol 202 may be a liquid suspension of PVC resin mixed with plasticizer and/or liquid stabilizer. The solvent-based polyvinyl chloride organosol 202 may be cast onto the film carrier 104 using the roll coating process, according to one embodiment.

The metering roll 204 may be a reverse-running nip of the reverse roll coating mechanism. The reverse roll coating may be a roll-to-roll coating method for wet coating of the solvent-based polyvinyl chloride organosol 202. It may contain two reverse-running nips, the metering roll 204 and the applicator roll 206. The metering roll 204 and the applicator roll 206 may contra-rotate, with an accurate gap between them. The surface of the applicator roll 206 may be loaded with an excess of coating 208 of the solvent based polyvinyl chloride organosol 202 prior to the metering nip 204, so its surface emerges from the metering nip 204 with a precise thickness of coating 208 of solvent-based polyvinyl chloride organosol 202 equal to the gap. At the application nip 206, the applicator roll may transfer all of this coating 208 to the film carrier 104, by running in the opposite direction to the movement of the film carrier 104, and wiping the coating 208 of solvent-based polyvinyl chloride organosol 202 onto the film carrier 104, according to one embodiment.

The plurality of ovens 210 may be a number of ovens placed along the path of movement of the film carrier 104 coated with solvent-based polyvinyl chloride organosol 202 to be cured into a solid film 212, according to one embodiment.

The cured solid film 212 may be a solidified layer of solvent-based polyvinyl chloride organosol 202 formed after traveling through the plurality of ovens 210 at varying temperatures, according to one embodiment.

Figure 2B:
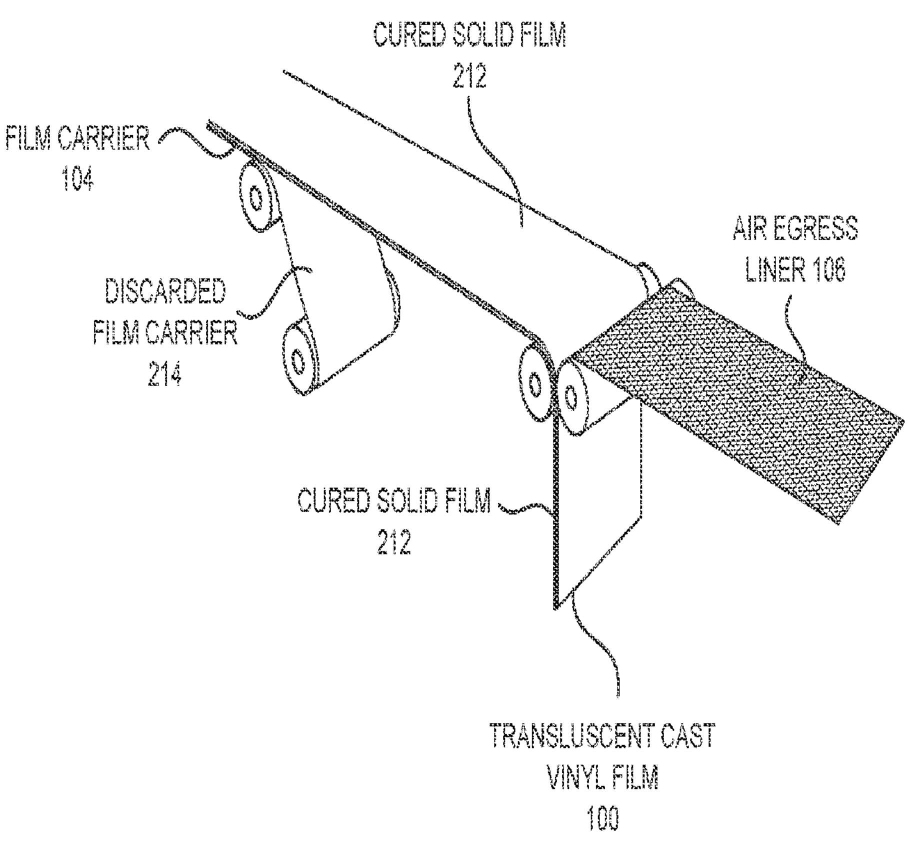
FIG. 2B is a continuation of the schematic diagram of FIG. 2A illustrating the lamination process of the cured solid film of polyvinyl chloride organosol with an air egress liner, according to one embodiment.

FIG. 2B is a continuation of the schematic diagram of FIG. 2A illustrating the lamination process of the cured solid film 212 of polyvinyl chloride organosol 102 with an air egress liner 106, according to one embodiment. Particularly, FIG. 2A builds on FIGS. 1 and 2A, and further adds, a discarded film carrier 214.

The discarded film carrier 214 may be the film carrier 104 layer removed from the cured solid film 212 to separate out the solidified layer of solvent-based polyvinyl chloride organosol 202 for further processing. The separated layer of cured solid film 212 may be laminated further to an air-egress liner 106 with a coating of an air-egress adhesive. The air-egress liner 106 may contain the air-egress adhesive layer 112 which may be adhered to the cured solid film 212 of polyvinyl chloride organosol 102 upon application of slight contact pressure, according to one embodiment.

The air-egress adhesive layer 112 may be a layer of semi-permanent viscous material of the translucent cast vinyl film 100 forming the adhesive layer to allow sticking of the translucent cast vinyl film 100. The air-egress adhesive layer 112 may allow for a faster, bubble free, and easier installation of the translucent cast vinyl film 100 with long term removability, according to one embodiment.

Figure 2B:
Figure 3A:
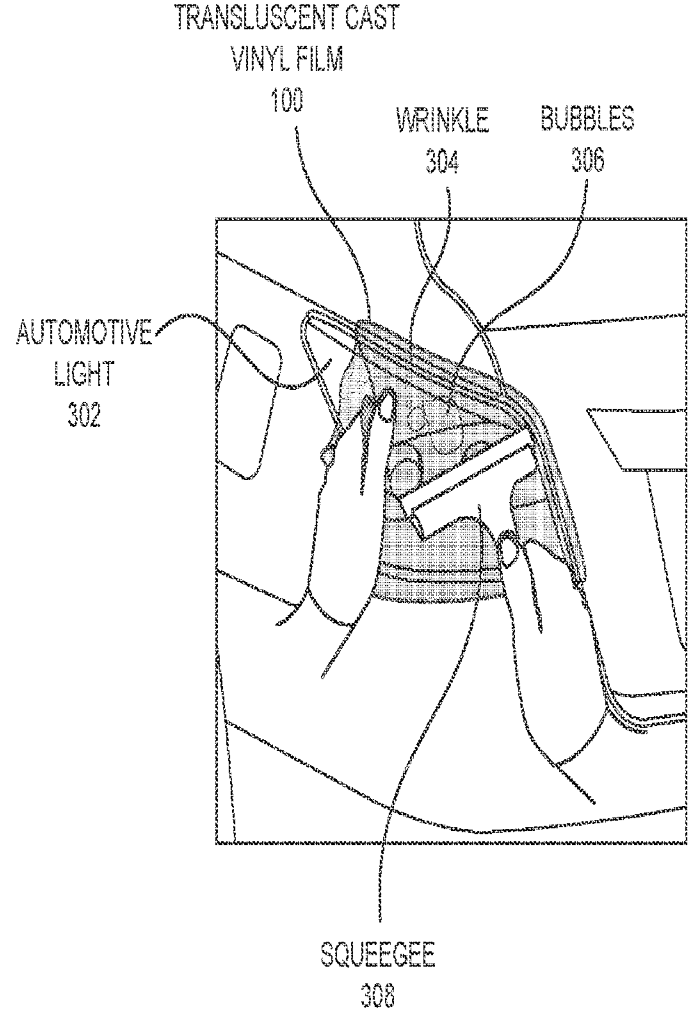
FIG. 3A and FIG. 3B illustrate an installation view of the translucent cast vinyl film of FIG. 1 on an automotive light of a car, according to one embodiment.

FIG. 3A illustrates an installation view 350A of the translucent cast vinyl film 100 on an automotive light 302, according to one embodiment. Particularly, FIG. 3A builds on FIGS. 1-2B, and further adds, an automotive light 302, wrinkle 304 and bubbles 306. The translucent cast vinyl film 100 may be applied on the automotive light 302 (e.g., headlight, taillight, etc.) after removing the paper liner from the back of the of the translucent cast vinyl film 100. The air-egress adhesive of the translucent cast vinyl film 100 may be tacky but may not adhere until pressure is applied. The translucent cast vinyl film 100 may be installed on the automotive light 302 without using any applicator fluid, and just by applying slight pressure. The translucent cast vinyl film 100 may be lifted up slightly and reapplied (e.g., using reapplication 310) to properly position the translucent cast vinyl film 100 onto the automotive light 302 (e.g., headlight, taillight, etc.). The translucent cast vinyl film 100 may be stretched and repositioned appropriately to conform to the shape of the automotive light 302 without damaging the air-egress adhesive layer 112 of the translucent cast vinyl film 100. The semi-permanent adhesive of the air-egress adhesive layer 112 of the translucent cast vinyl film 100 allows the film to be lifted up and reposition it to remove any bubbles and wrinkles formed behind the film by working towards the outside edges of the automotive light 302. The air-release patterning 108 of the translucent cast vinyl film 100 may ensure that air does not get trapped while installation of the film, according to one embodiment.

Figure 3B:
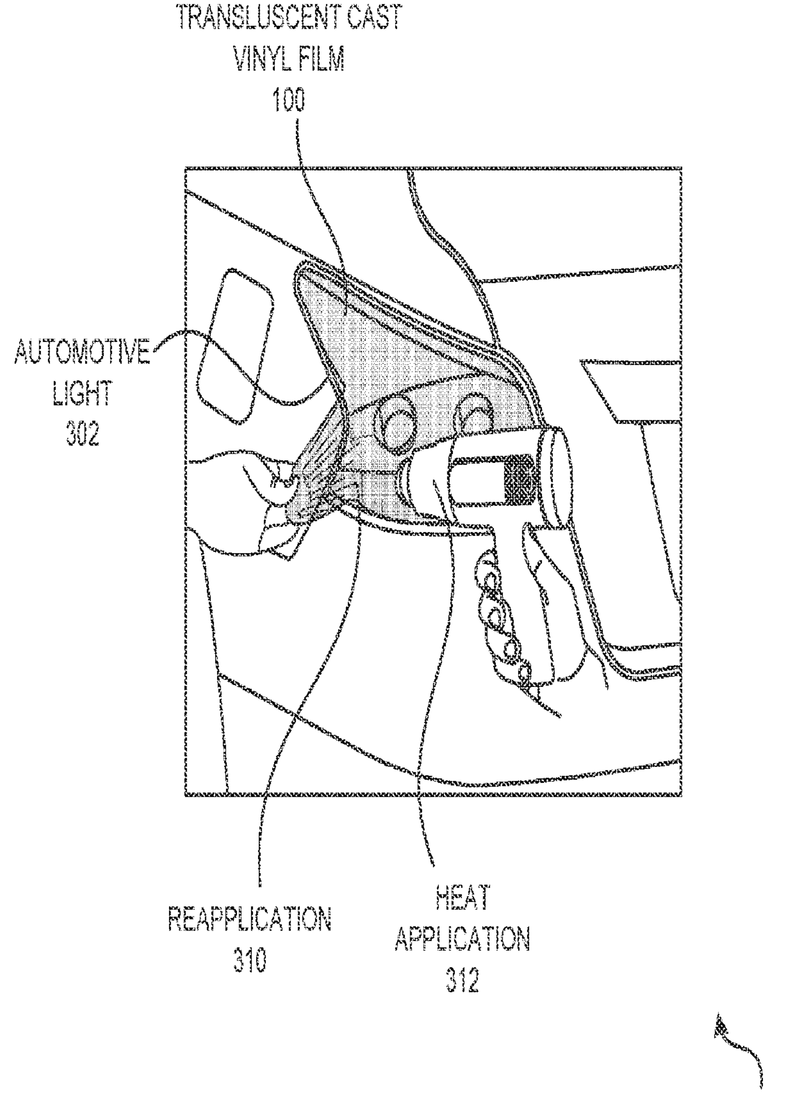

FIG. 3B illustrates application of heat to relax the translucent cast vinyl film 100 in order to soften the translucent cast vinyl film 100 to allow it to reposition it by conforming to the shape of the automotive light 302, according to one embodiment.

Once the translucent cast vinyl film 100 is located properly, the heat may be applied to soften the film so that it can be stretched to conform to the shape of the light in the best possible way. The softened translucent cast vinyl film 100 may become stretchable to allow it to be adjusted around the automotive light 302 to conform to the shape of the automotive light 302. When the translucent cast vinyl film 100 is stretched and/or is touched with heat (e.g., using heat application 312), the glue in the air-egress adhesive may liquefy and flow. This liquified glue in the air-egress adhesive may soften the translucent cast vinyl film 100 to all easy installation. In addition, the air bubbles behind the film may be removed and/or disappear. The film is then squeegeed onto the surface, which is when the air release channels 110 of the air-egress adhesive layer 112 helps the air stuck between the surface and the vinyl to work itself out, After the air is removed, the repositioned film is applied heat so that the film's memory effect is destroyed and it accepts the new non-flat shape long term, according to one embodiment The diamond shaped air-release patterning 108 of the semi-permanent adhesive in the translucent cast vinyl film 100 may be fine enough to get the air escape behind the film. The semi-transparent color of the translucent cast vinyl film 100 may give the desired properties of being able to allow the light to penetrate through, without any glue visible to an observer on the outside, and minimize the air pocket (e.g., bubbles 306, wrinkles 304) to enable a smooth surface kind of visual appearance, according to one embodiment.

The translucent cast vinyl film 100 may conform well to the curved shapes and strongly retain its new shape once it is applied. This durability of shape may allow for predictability on application, according to one embodiment.

Figure 4:
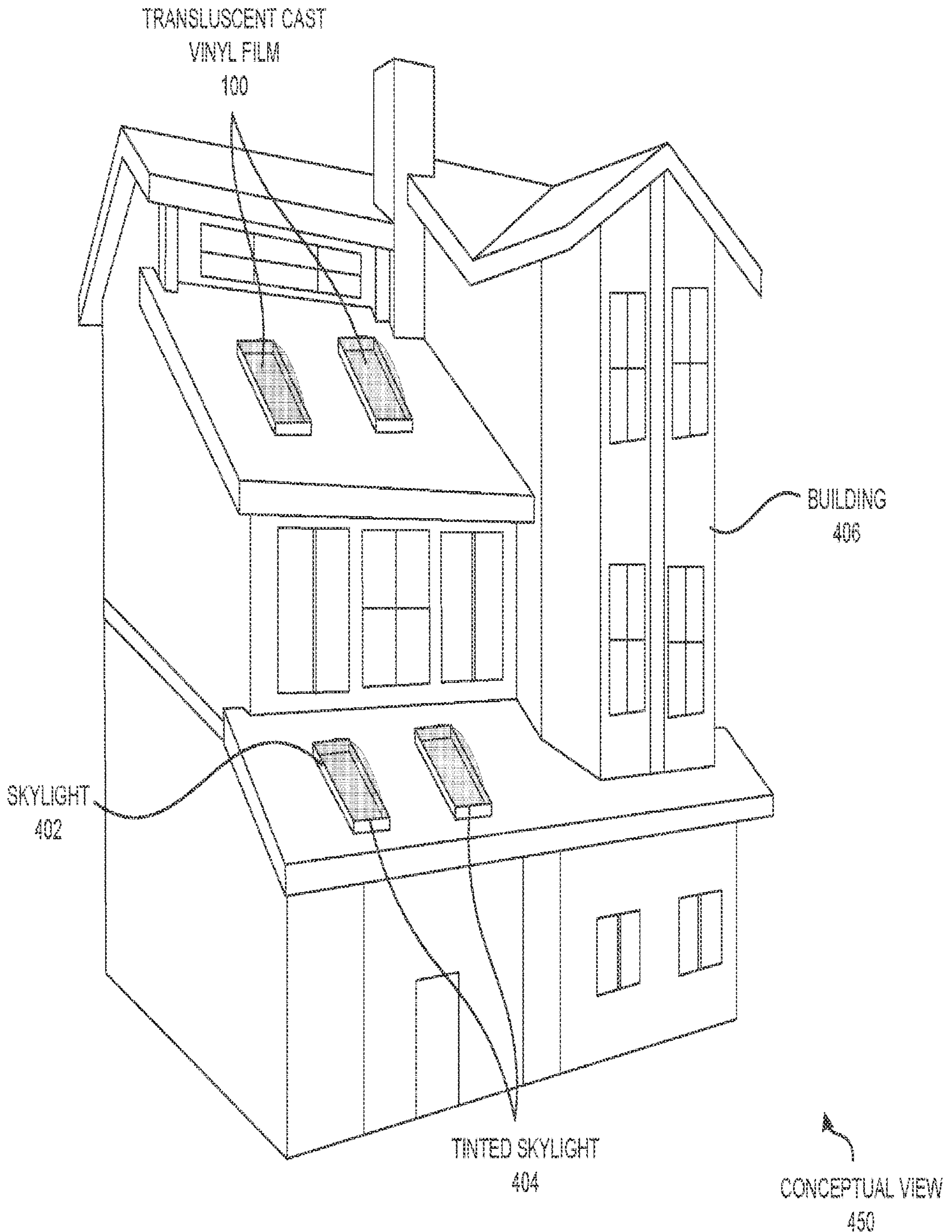
FIG. 4 is a conceptual view of the translucent cast vinyl film of FIG. 1 used for tinting a skylight of a building, according to one embodiment.

FIG. 4 is a conceptual view 450 of installation of the translucent film installation view 100 on a skylight 402 illustrating tinting of the skylight 402 to minimize the intensity of daylight inside the building, according to one embodiment. Particularly, FIG. 4 builds on FIGS. 1-3B, and further adds, a skylight 402, a tinted skylight 404 and a building 406. The translucent cast vinyl film 100 may be installed on the skylight 402 to allow ting. The skylight 402 may be a window set roof and/or ceiling used to provide a building with daylighting and ventilation. The skylight 402 may be tinted to prevent unwanted summertime solar heat gain and wintertime heat loss in a building 406. The translucent cast vinyl film 100 may be used to provide a more thermally efficient unit by installing the translucent cast vinyl film 100 onto the skylight 402. The translucent cast vinyl film 100 applied on the skylight 402 for tinting may form a solar film to restrict heat absorption and reduce glare. The tinted skylight 404 may help to minimize intensity of daylight entering inside the building 406 and help in screening out the UV radiation to create a more comfortable environment inside the building 406 according to one embodiment.

Figure 5:
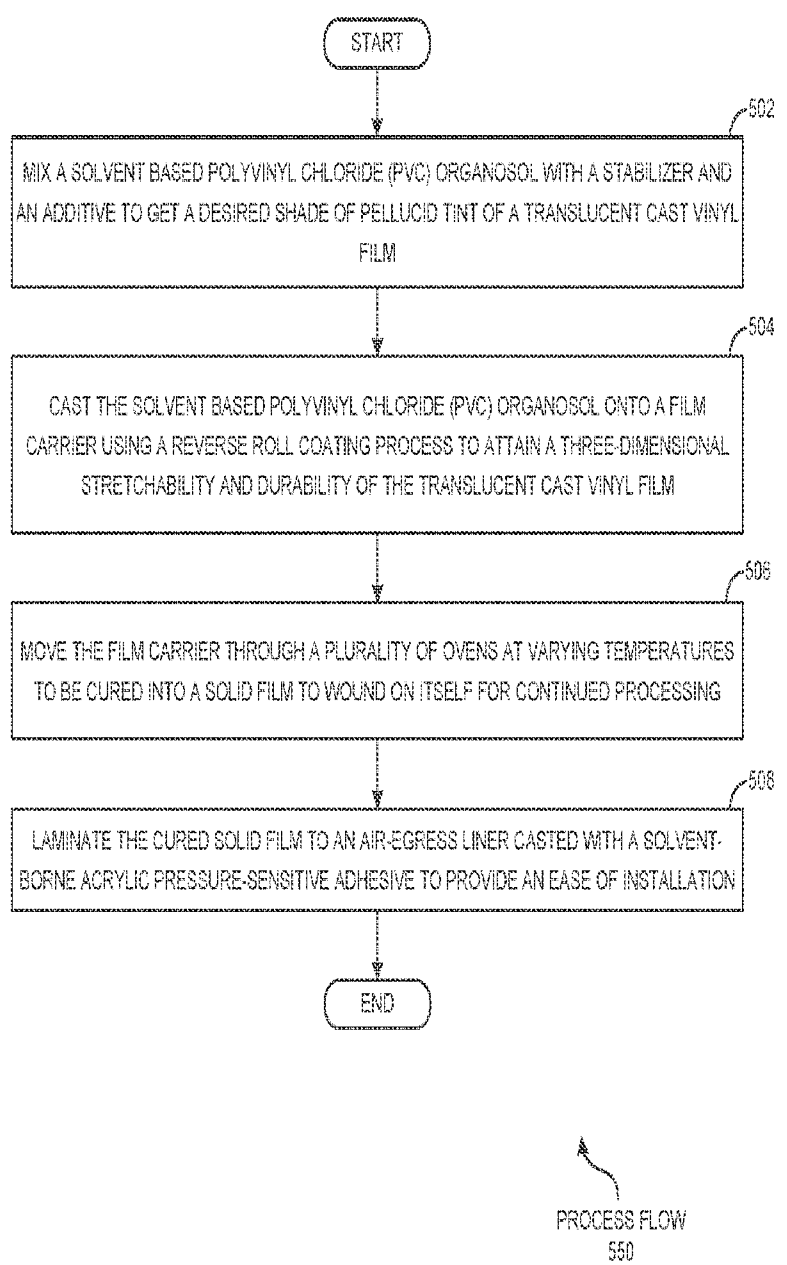
FIG. 5 is a process flow diagram detailing the operations involved in manufacturing of the translucent thermoplastic stretch wrap film, according to one embodiment.

FIG. 5 is a process flow 550 diagram detailing the operations involved in manufacturing of the translucent cast vinyl film 100, according to one embodiment. In operation 502, a solvent based polyvinyl chloride (PVC) organosol 202 may be mixed with a stabilizer and an additive to get a desired shade of pellucid tint of a translucent cast vinyl film 100.

In operation 502, the polyvinyl chloride (PVC) organosol may be casted onto a film carrier 104 using a reverse roll coating process for attaining a three-dimensional stretchability and durability of the translucent cast vinyl film 100.

In operation 504, the film 104 is moved through a plurality of ovens 210 at varying temperatures to be cured into a solid film 212 to wound on itself for continued processing.

In operation 504, the cured solid film 212 is laminated to an air-egress liner 106 casted with a solvent-borne acrylic pressure-sensitive adhesive (e.g., air egress adhesive) to provide an ease of installation, according to one embodiment.

An example embodiment will now be described. Mike Doe may have bought a new SUV model to celebrate the success of his new enterprise that be launched after a going through a rough phase in his professional career. Mike may be very protective about his new SUV car and may have wanted to use his prized possession very carefully. Mike may want to give his new SUV car a more attractive look. Mike may have wanted to give the head and taillights of his new car a sleeker, lustrous look. For this, Mike may have decided to tint the headlights and taillights of his new car by applying vinyl wraps.

Mike may have decided to install a semi-permanent vinyl film on its SUV's headlights and taillights, as described in various embodiments of FIGS. 1-5. Mike may have found this new translucent cast vinyl film 100 to be easy to install on complex contours of the headlights and taillights (e.g., automotive lights 302) of his new car. As described in various embodiments of FIGS. 1-5, Mike may have found that translucent cast vinyl film 100 is easily reposition able around its car's lights without requiring an application fluid while installation. Further, Mike may have found that this new translucent cast vinyl film 100 does not leave any glue marks even on lifting up the film from its place to reapply for better positioning onto the head and taillights (e.g., automotive lights 302). This new translucent cast vinyl film 100 may have provided three-dimensional stretchability and long-term durability giving a glossier, tinted look to the headlights and taillights (e.g., automotive lights 302) of his new car, making him happy.

Another example embodiment will now be described. ACME Care Group may be a leading healthcare provider in the State of Arizona, running healthcare facilities across the state. The ACME Care Group may be working on providing high-quality care and healing environment to its patients at its facility. The ACME Care Group may have found that physical healthcare environment can make a difference in how quickly patients recover and/or adapt to specific acute and chronic conditions. In order to provide an improved healing environment to its patients, the ACME Care Group may be planning to remove and/or minimize environmental stressors, such as, bright natural light, poor artificial lighting, and increased sun's glare. The ACME Care Group may have found that refurbishing the whole facility may be an expensive and demanding task.

In order to improve the healthcare environment in its facility, the ACME Care Group may have decided to install protective semi-permanent film on its domed skylights as described in various embodiments of FIGS. 1-5. The installation of translucent cast vinyl film 100 onto its domed skylights 402 may have helped the ACME Care Group improve daylight conditions by preventing unwanted summertime solar heat gain and wintertime heat loss through its exposed domed skylights 402. The tinted domed skylights 402 at its facility may have improved its healthcare environment for its patients by restricting the intensity of sun's glare entering into its facility and screening out the UV radiation. The installation of translucent cast vinyl film 100 as described in various embodiments of FIGS. 1-5 may have helped ACME Care Group remove and minimize environmental stressors in its facility by improving natural light conditions.

Further, the ACME Care Group may have installed the translucent cast vinyl film 100 onto its skylights 402 for a less intense daylight creating a soothing environment in its facility, giving its patients a psychological and physical lift, leading to an improved self-healing environment to its patients, making them happier. The installation of translucent cast vinyl film 100 may have helped the ACME Care Group to facilitate providing an improved healing environment to its patients without requiring refurbishing its whole facility, saving its resources.

A number of embodiments have been described. Nevertheless, it, will be understood that various modifications may be made without departing from the spirit and scope of the claimed invention. In addition, the composition depicted in the figures does not require the particular combination, or sequential order, to achieve desirable results. In addition, other formulations and factors may be provided, or steps, and factors may be eliminated, from the described method of preparation, and other components may be added to, or removed from, the described systems. Accordingly, other embodiments may within the scope of the following disclosure and/or claims.

The structures and modules in the figures may be shown as distinct and exemplary embodiments with only a few specific structures and not others. The structures may be merged with each other, may perform overlapping functions, and may operate with other structures not shown to be connected in the figures. Accordingly, the specification and/or drawings may be regarded in an illustrative rather than a restrictive sense.

The invention claimed is:

1. A vinyl film for applying to a complex-shaped surface comprising:

(a) a polyvinyl chloride (PVC) portion including a PVC organosol layer formed by casting, using a casting process, a liquid organosol mixture on a film carrier, and wherein the film carrier is removable from the PVC organosol layer after casting; and (b) an adhesive portion including an adhesive that is pressure-sensitive with air-egress channels that is on a removable liner;

(c) wherein the adhesive is directly coupled to the PVC organosol layer;

(d) wherein the vinyl film is adapted to be applied to a complex-shaped surface after removal of the removable liner by pressing the adhesive onto the complex-shaped surface and applying heat to the adhesive;

(e) wherein the casting process of the PVC organosol layer onto the film carrier enables three-dimensional stretchability to 130 percent and enables durability of the vinyl film and reduces shrinking back of the vinyl film when installed on the complex-shaped surface;

(f) wherein the casting process provides increased three-dimensional stretchability and durability of the vinyl film enabling stretching and repositioning of the vinyl film during installation of the vinyl film onto the complex-shaped surface; and (g) wherein the pressure sensitive adhesive is semi-permanent and is adapted to enable long-term removal of the vinyl film from the complex-shaped surface.

2. The vinyl film of claim 1, wherein:

(i) the adhesive is a solvent-borne acrylic pressure-sensitive viscous material and the air-egress channels allow escape of air from a back of the vinyl film when installing onto the complex-shaped surface;

(ii) the vinyl film is repositionable by liquifying the adhesive with application of heat to allow appropriate stretchability for re-installation of the vinyl film; and (iii) the adhesive is a semi-permanent adhesive adapted to allow for removability leaving 30% or less adhesive residue.

3. The vinyl film of claim 2, wherein the air-egress channels are interconnected.

4. The vinyl film of claim 2 wherein the vinyl film is tinted and translucent.

5. A vinyl film that is adapted for applying to a complex-shaped surface, comprising:

(a) a pre-application configuration, that is present prior to application of the vinyl film onto the complex-shaped surface, that includes layers of:

(i) a Poly Vinyl Chloride (PVC) organosol layer, which is a top layer, formed by casting, using a casting process, including a PVC organosol mixture on a carrier and curing the PVC organosol mixture while on the carrier to solidify the PVC organosol layer;

(ii) an adhesive that is pressure sensitive and includes air egress channels;

(iii) a removable liner; and (b) a post application configuration after removal of the removable liner and application of the vinyl film onto the complex-shaped surface including directly adjacent layers of:

(i) the PVC organosol layer; and (ii) the adhesive, wherein at least a substantial portion of the air egress channels of the adhesive becomes less visible after stretching of the film and application onto the complex-shaped surface;

wherein the casting process causes increased stretchability and durability of the vinyl film enabling stretchability and repositioning during installation of the vinyl film onto the complex-shaped surface; and wherein the adhesive is adapted to enable removability of the vinyl film from the complex-shaped surface leaving minimal residue.

6. The vinyl film of claim 5, wherein the PVC organosol layer includes vinyl resin, a plasticizer, and a pigment.

7. The vinyl film of claim 5, wherein the PVC organosol layer includes vinyl resin, a plasticizer, a pigment and an active solvent.

8. The vinyl film of claim 5 wherein the PVC organosol layer includes a vinyl resin, a plasticizer, an epoxidised plasticizer, pigment, a stabilizer and one or more desired fillers.

9. The vinyl film of claim 5 wherein the adhesive is clear.

10. The vinyl film of claim 5 wherein at least a substantial portion of the air-egress channels become invisible after application when stretched at least 10 percent during application.

11. A tinted translucent vinyl film with a clear air-egress adhesive layer comprising:

a top layer of a cast Poly Vinyl Chloride (PVC) vinyl formed by casting a liquid organosol mixture blended with a plasticizer and a diluent, wherein the liquid organosol mixture includes a dispersed polyvinyl chloride resin mixed with a plasticizer and a diluent; and a base layer of an acrylic pressure-sensitive adhesive with air-egress channels on a removable paper liner, the base layer formed using viscoelastic material to adhere to the top layer of the cast PVC vinyl upon application of light contact pressure and to allow repositioning of the tinted translucent vinyl film around a complex, bulbous shaped surface of an automotive light and a chrome;

wherein a casting process used to form the top layer causes an increased stretchability and/or durability of the vinyl film and reduces shrinking back of the vinyl film when installed on the complex, bulbous shaped surface; and wherein the pressure sensitive adhesive is semi-permanent and is adapted to enable long-term removal of the vinyl film from the complex, bulbous shaped surface.

12. A tinted translucent vinyl film with an air-egress adhesive layer comprising:

a top layer of a cast Poly Vinyl Chloride (PVC) vinyl formed by casting a liquid organosol mixture blended with a plasticizer and a diluent, wherein the liquid organosol mixture includes a dispersed polyvinyl chloride resin mixed with the plasticizer and the diluent; and a base layer of a pressure-sensitive adhesive with air-egress channels on a removable liner, the base layer formed using viscoelastic material that adheres to the top layer of the cast PVC vinyl upon application of light contact pressure;

wherein the base layer can be applied to a complex shaped surface using heat application; and wherein the base layer enables application of and repositioning of the tinted translucent vinyl film around said surface.

13. A vinyl film comprising:

a) a top vinyl layer adapted to be softened and stretchable with heat application;

b) an adhesive layer that is pressure sensitive and includes air egress channels; the adhesive layer adapted to at least partially liquefy with heat application;

c) wherein the adhesive layer is directly adhered to the top vinyl layer;

d) wherein the adhesive layer, while coupled to the top vinyl layer, is adapted to be applied to a complex-shaped surface;

e) wherein application of heat during installation of the top vinyl layer and adhesive layer on the complex-shaped surface enables stretching, lifting up, and/or repositioning as needed during installation;

f) wherein the adhesive layer is semi-permanent enabling clean, long-term removability from the complex-shaped surface with an ability to leave no to minimal residue after use for a plurality of years; and g) wherein there is no to minimal shrinking back of the top vinyl layer coupled to the adhesive layer after installation onto the complex-shaped surface.

14. A vinyl film comprising:

a) a top vinyl layer adapted to be softened and stretchable with heat application;

b) an adhesive layer that is pressure sensitive and includes air egress channels; the adhesive layer adapted to at least partially liquefy with heat application;

c) wherein the adhesive layer is directly adhered to the top vinyl layer;

d) wherein the adhesive layer, while coupled to the top vinyl layer is adapted to be applied to a complex-shaped surface; and e) wherein application of heat during installation of the top vinyl layer and adhesive layer on the complex-shaped surface enables stretching, lifting up, and/or repositioning as needed during installation; and f) wherein there is no to minimal shrinking back of the top vinyl layer coupled to the adhesive layer after installation onto the complex-shaped surface.

15. The vinyl film of claim 14 wherein the adhesive layer is clear.

16. The vinyl film of claim 14 wherein at least a substantial portion of the air egress channels become invisible after application.

17. A method of manufacturing a vinyl wrap that is stretchable and repositionable and that is for adhering to a complex-shaped surface, the method comprising the steps of:

a) mixing a liquid organosol with a polyvinyl chloride (PVC) resin to form a PVC organosol mixture;

b) casting, using a casting process, the PVC organosol mixture onto a film carrier;

c) moving the film carrier after step (b) through an oven to cure the PVC organosol mixture and form a cast vinyl film; and d) laminating the cast vinyl film to an adhesive that is pressure sensitive and semi-permanent and that is cast on a liner; wherein the cast vinyl film is the top layer;

wherein the film carrier and the liner are removable from the cast vinyl film and the adhesive prior to application of the vinyl wrap on the complex-shaped surface;

wherein the casting process of step (b) causes an increased three-dimensional stretchability and durability of the cast vinyl film;

wherein the adhesive allows repositioning of the cast vinyl film while installing onto the complex-shaped surface wherein the adhesive can be lifted up and re-applied to the complex-shaped surface; and wherein the adhesive is semi-permanent enabling removability from the complex-shaped surface.

18. The method of claim 17 wherein the organosol mixture includes a plasticizer, a diluent and a pigment.

19. The method of claim 17 wherein the casting process of step (b) is a reverse roll coating process that enables up to 130% stretchability of the vinyl wrap during installation of the vinyl wrap.

20. The method of claim 19 wherein the reverse roll coating process enables the cast vinyl film to be installed on the complex-shaped surface with no to minimal shrinking back of the cast vinyl film.

21. The method of claim 17 wherein the adhesive is adapted to remain removable from the complex-shaped surface after installation for at least 3 years using heat and/or chemicals.

22. The method of claim 17 wherein the adhesive includes an air release patterning with air egress channels that allow air to escape when installing the cast vinyl film onto the complex-shaped surface eliminating or lessening the presence of air bubbles during installation.

23. The method of claim 17 wherein the adhesive is adapted to enable clean removability allowing the vinyl wrap to be removed leaving less than 30% of adhesive residue on the complex-shaped surface.

* * * * *